Feb. 21, 1950     L. W. BALLARD     2,497,921
METHOD OF APPLYING PROTECTOR
COLLARS TO DRILL PIPES
Filed Oct. 24, 1947     3 Sheets-Sheet 1
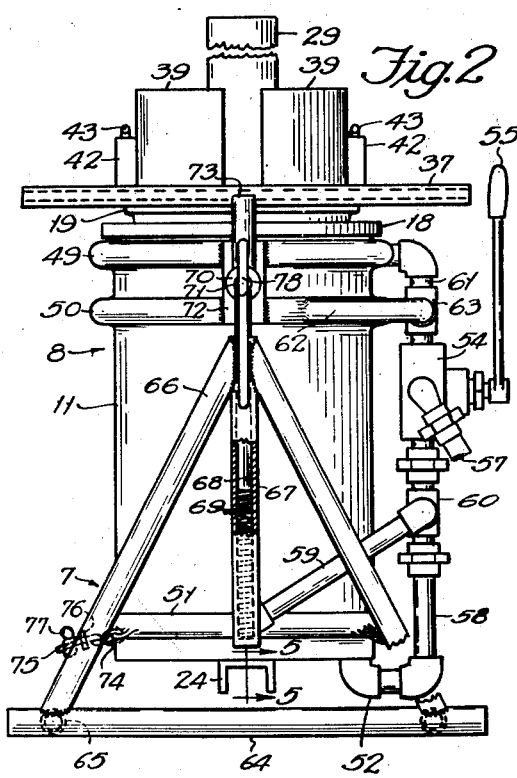
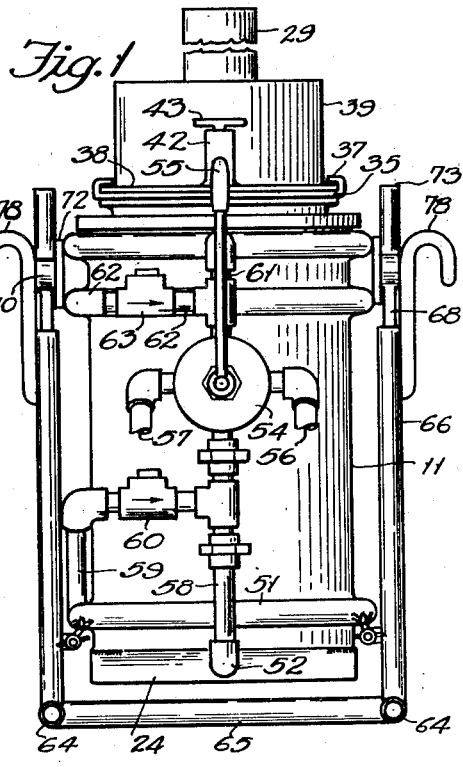
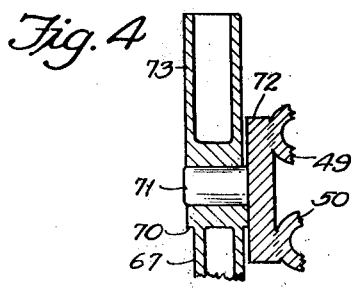
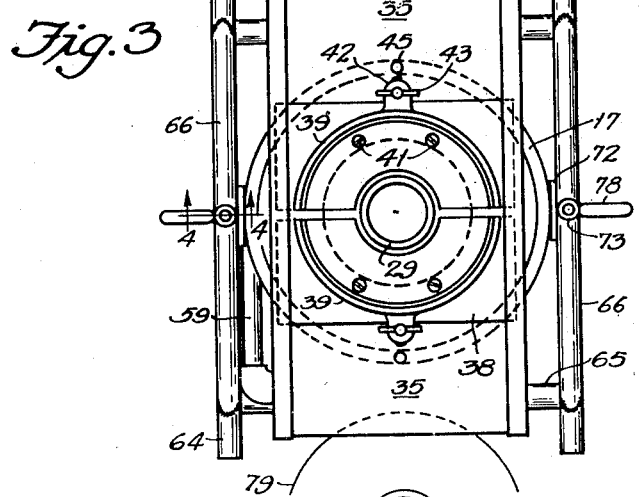
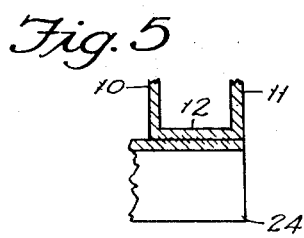
INVENTOR.
BY LESTER W. BALLARD
Lynn Latta
-ATTORNEY- Feb. 21, 1950 — L. W. BALLARD — 2,497,921
METHOD OF APPLYING PROTECTOR COLLARS TO DRILL PIPES
Filed Oct. 24, 1947 — 3 Sheets-Sheet 2

INVENTOR.
BY LESTER W. BALLARD
— ATTORNEY —

Feb. 21, 1950 — L. W. BALLARD — 2,497,921
METHOD OF APPLYING PROTECTOR COLLARS TO DRILL PIPES
Filed Oct. 24, 1947 — 3 Sheets-Sheet 3

INVENTOR.
LESTER W. BALLARD
BY
ATTORNEY

Patented Feb. 21, 1950

2,497,921

UNITED STATES PATENT OFFICE 2,497,921

METHOD OF APPLYING PROTECTOR COLLARS TO DRILL PIPES

Lester W. Ballard, Avenal, Calif.

Application October 24, 1947, Serial No. 781,931

2 Claims. (Cl. 29—148.2)

This invention relates to the art of applying annular protectors of rubber or equivalent stretchable material to drill pipes for protecting the pipe against abrasion during the drilling operation.

The common method of applying drill pipe protectors, in use today in the oil fields, is to utilize a machine (usually a hydraulic press) for expanding the protector onto a mandrel having a diameter sufficiently large to permit it to be readily slipped over the tool joint on the end of a drill pipe section. After the protector has been expanded onto the mandrel, the mandrel is removed from the expander press and is applied to another machine having means for forcing the protector off the mandrel onto a drill pipe that has been inserted into the mandrel. During these several operations the protector is applied over one end of the mandrel and is removed from the same end of the mandrel.

The hydraulic press that is used for applying the protector to the mandrel is quite heavy and it is customary to leave this press in the truck that is used for hauling the equipment to the site of operation. The removal of the protector from the mandrel onto the drill pipe is sometimes performed upon pipe laying in the rack adjacent the oil well in which it is to be used, but is more often performed upon pipe hanging in the derrick. In the latter instance, the workmen must travel back and forth between the derrick and the truck in transferring the mandrel back and forth from the expanding press to the removing machine, or, in the alternative, must utilize a number of mandrels, installing protectors on them at the expanding machine and then carrying them to the derrick.

The primary object of the present invention is to provide a method for installing drill pipe protectors in a more simple manner, with less difficulty, and in much shorter time than has been involved previously. In general, my invention embodies the concept of progressively expanding a series of protectors onto a mandrel from one end thereof and forcing them off of the other end of the mandrel onto drill pipe. Thus a continuous progression of protectors, moving always in the same direction, may be forced over the mandrel and onto the drill pipe.

It has previously been proposed to attach an expander cone to the lower end of a drill pipe, to insert the small end of the cone into a protector, and to force the protector over the expander cone and onto the tool joint of a drill pipe. One of such proposals contemplated utilizing the weight of the drill pipe to force the cone downwardly through the protector while the latter was supported by an abutment means. Another such proposal contemplated inserting a cone having its small end extended to form a shaft, through a protector and attaching the end of the shaft to a hydraulic press having means to force the protector up over the shaft and cone and onto a tool joint which was attached to a mandrel forming a continuation of the large end of the cone. Another such prior proposal contemplated a hollow mandrel, adapted to loosely receive the tool joint, having a cone at one end and a stem projecting from the small end of the cone and adapted to be passed through a protector and then detachably connected to a hydraulic press having means for forcing the protector over the cone and onto the drill pipe. However, none of such prior devices have proved satisfactory for commercial operation, although a definite need for an apparatus that would speed up and remove the difficulties of applying drill pipe protector fans, has been needed for many years.

My invention provides a method that will reduce the installing time of the best method previously available, to the extent of eliminating 75% of the time previously required by such prior method.

An important feature of the invention is the provision for loose reception of the entire tool joint within a collar expanding mandrel, whereby the protector may be pressed entirely over the mandrel and directly onto the drill pipe, and whereby the drill pipe may be lifted or permitted to move upwardly as the protector is moved off the upper end of the mandrel and commences to grip the drill pipe.

The invention has as its primary object to provide a method by which it is possible to successfully achieve the rapid application of protectors to drill pipes hanging suspended in a derrick, completely eliminating the necessity for carrying a mandrel back and forth between an expanding apparatus and an applying apparatus, and reducing the time required for application to only a fraction of the time required by existing methods.

Other objects will become apparent in the ensuing specifications and appended drawings in which:

Fig. 1 is a front elevation of a protector applying apparatus adapted for use in the practice of my invention;

Fig. 2 is a side elevation of the same, with the small portion thereof shown in sections;

Fig. 3 is a plan view of the same;

Fig. 4 is a detail sectional view taken on the line 4—4 of Fig. 3;

Fig. 5 is a detail sectional view taken on the line 5—5 of Fig. 2;

Figure 6:
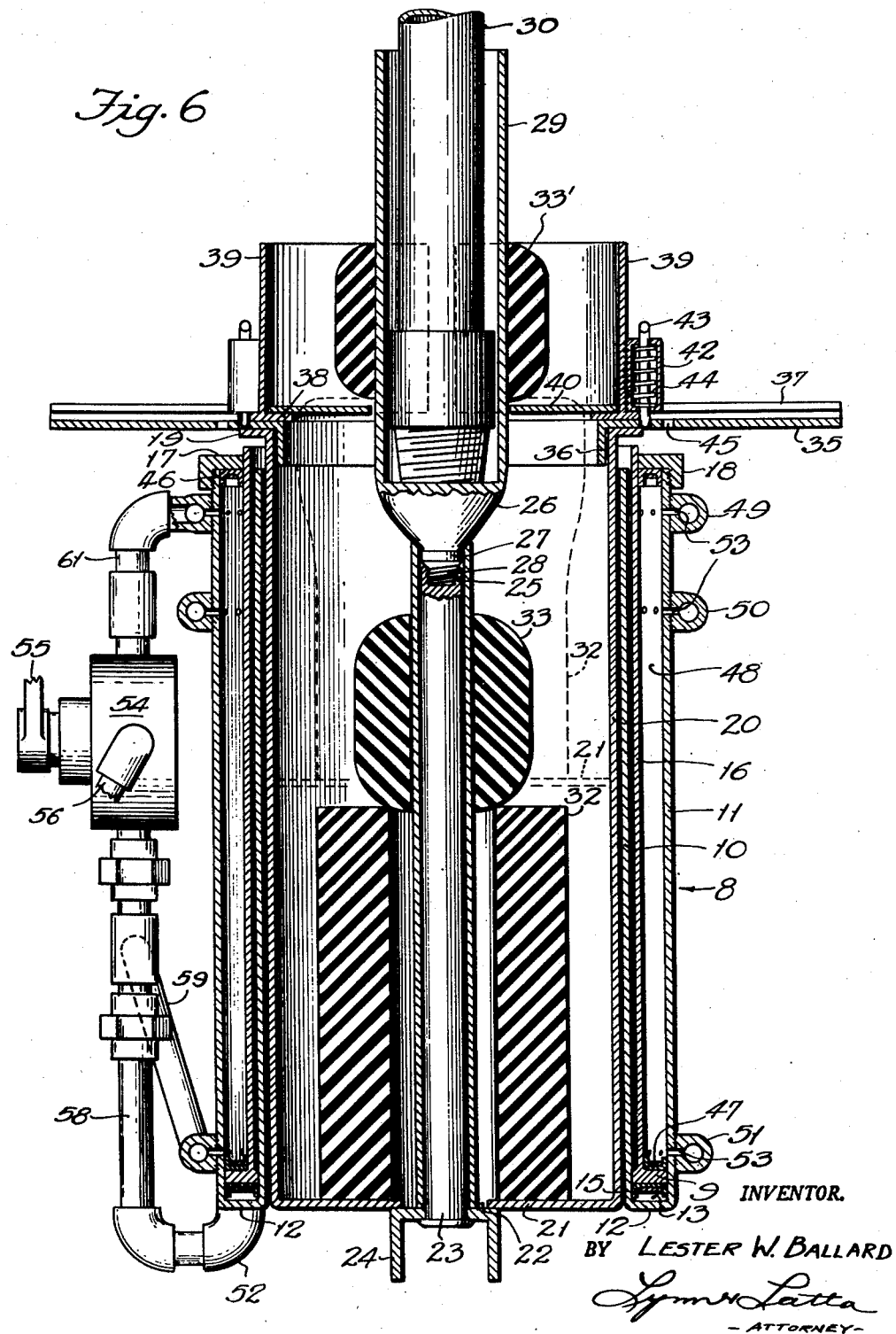
Fig. 6 is a vertical axial sectional view of the apparatus.

As an example of one form of apparatus which may be used with satisfactory results in the practice of my invention, I have shown in the drawings an installing apparatus comprising a supporting easel, indicated generally at 7, and a hydraulic press which is indicated generally at 8.

Referring now to Fig. 6, the hydraulic press 8 includes a hydraulic engine embodying an annular piston 9 that is vertically slidable between spaced coaxial cylinders 10 and 11 respectively. The lower ends of the cylinders 10 and 11 are integrally joined by a base ring 12, and an annular fluid chamber 13 is defined between the base ring 12 and piston 9, into which fluid for forcing the piston upwardly, may be injected. An annular packing collar 15 of flexible material such as leather is attached to the under face of the piston 9 and makes sealing engagement with the opposed walls of the cylinders 10 and 11. The inner face of the piston 9 has bearing engagement with the adjacent wall of the cylinder 10 to position the piston. Secured to and projecting upwardly from the piston 9 is a sleeve 16 the outer face of which has bearing engagement with the inner periphery of a cap ring 17 the rim flange 18 of which is threaded upon the upper end of the cylinder 11.

The sleeve 16, when moved upwardly, engages a flange 19 projecting outwardly from the upper end of a guard sleeve 20. The guard sleeve 20 projects downwardly inside the cylinder 10 and carries at its lower end an annular abutment shoulder 21. The sleeve 16 functions both as a means to transmit movement from the piston 9 to the guard sleeve 20, and also as means to provide one annular wall of a fluid chamber 48 in which fluid pressure may operate on the piston 9 to move it downwardly. The chamber 48 is defined between the sleeve 16, the outer cylinder 11, a packing ring attached to the cap ring 17 and engaging the sleeve 16, and a packing ring 47 attached to the piston 9 and engaging the cylinder 11.

Projecting upwardly through the hole 22 in the center of the abutment shoulder 21 is a guide stem 23 the lower end of which is permanently anchored to a fixed sill member 24. The ends of the sill member 24 extend beneath opposite side portions of the cylinder base ring 12 and are secured thereto, preferably by welding as indicated in Fig. 5. Thus the stem 23 constitutes a fixed portion of the apparatus, and the annular abutment shoulder 21 is adapted to move upwardly relative to the stem 23. The upper end of the stem 23 is provided with an internally threaded socket 25. An expander cone 26 has at its smaller end a shank 27 of the same diameter as the stem 23 and terminating in a reduced threaded portion 28 adapted to be threaded into the threaded socket 25 to provide a quickly detachable connection between the stem and the cone. The larger end of the cone 26 is continued to form a hollow cylindrical mandrel 29 into which the lower end of a suspended drill pipe 30, including the tool joint 31 thereof, may be loosely received.

A resilient follower sleeve 32 has its lower end supported upon the annular abutment shoulder 21 and the stem 23 extends upwardly therethrough. A resilient drill pipe protector collar 33 of soft rubber or equivalent material is shown supported upon the upper end of the follower 32. The stem 23 projects upwardly beyond the upper end of the sleeve 32 to a sufficient height so as to project entirely through a protector collar 33 of the largest size commonly used for drill pipe protection, with its upper end exposed to permit ready insertion of the threaded end 28 of the mandrel into the socket 25. The sleeve 32 is of rubber or other material having sufficient ability to stretch so as to expand over the cone 26 and onto the mandrel 29. The inner diameter of the sleeve 32 is considerably larger than the diameter of the stem 23, so as to reduce the amount of expansion that the sleeves 32 must undergo in order to stretch to the diameter of the mandrel. The outer diameter of the sleeve 32 is considerably less than the inner diameter of the guard sleeve 20, sufficiently so that the sleeve 32 does not at any time expand into contact with the wall of the guard sleeve.

The stroke of the hydraulic engine is adequate to move the protector collar 33 onto the mandrel 29 to a position, such as that indicated at 33' in Fig. 6, in which the lower end of the collar is above the plane of the flange 19 at the upper end of the guard sleeve. In the next stroke of the apparatus, while a new collar is being moved up to this position, the previous collar will be moved off the end of the mandrel by pressure applied thereto through an abutment member receiving movement from the flange 19. Such abutment member may comprise simply a flat washer 40a, such as that shown in Fig. 8, slipped over the cone 26 and mandrel 29 below the previously expanded collar 33' and brought to rest against the flange 19 as the mandrel is reattached to the stem 23, or it may comprise the more elaborate apparatus illustrated in Figs. 1, 2, 3 and 7. The latter abutment apparatus comprises an elongated rectangular base plate 35 having a central, depending collar 36 defining an opening therein and having channeled slideways 37 extending along its longitudinal sides. The collar 36 is loosely receivable in the upper end of the guard sleeve 20 and the base plate 35 is adapted to rest upon the flange 19 of the guard sleeve. Slidably mounted in the slideways 37 are a pair of flat slides 38 each having a semi-circular guard 39 secured to its upper surface and projecting upwardly therefrom, and each having a semi-circular inner extremity projecting inwardly from the guard 39 in the form of a flange or shoulder on which is seated a semi-circular abutment member 40. Abutment members 40 of varying inner diameters may be detachably secured to the flange 38 by screws 41 as indicated in Fig. 3. Slidably mounted in cylindrical capsules 42 attached to the outer sides of the guards 39, a pair of latch bolts 43 are urged downwardly by coil springs 44 into latching engagement in openings 45 in the base plate 35, in order to position the abutments 40 in selected positions of adjustment relative to the mandrel 29, and to hold them against spreading under the reaction of a protector collar 33' thereagainst as the latter is pushed off the upper end of the mandrel.

Fluid under pressure may be injected from a manifold 49 into the chamber 48 in order to force the piston 9 downwardly. A manifold 50 communicates with the chamber 48 at a level below the manifold 49, and functions to provide a bypass for releasing pressure from the chamber 13 when the piston 9 has reached an upper limit of movement. A manifold 51, similarly spaced above the level where pressure fluid is introduced into the chamber 13 (through an inlet 52) similarly functions to relieve the pressure in the chamber 48 when the piston 9 has reached a lower limit of movement. In each case, the pressure relief functions to prevent damage to the hydraulic engine in the event the operator should fail to shut off the fluid flow when a limit of piston movement has been reached.

Communication between the manifolds 49, 50 and 51 and the chambers 48 and 13 is established through a large number of small, closely spaced ports 53 extending through the cylinder 11 and distributed round the entire circumference thereof. Where the diameter of the cylinder 11 is, for example, two feet, the ports 53 may be approximately an inch apart, thus providing for unrestricted fluid flow into and out of the pressure chambers and even distribution of fluid pressure around the circumference of the chambers.

The hydraulic system includes a two-way valve 54 having a control lever 55 which may be adjusted from the neutral position shown in Fig. 1 to either of two flow positions one on either side of said neutral position. A pressure line 56 delivers fluid into the valve 54 through an inlet, and a return line 57 carries fluid from the valve outlet back to the power driven pump that is employed for pumping the fluid through the pressure line 56. From the valve 54, a delivery pipe 58 leads to the lower cylinder inlet 52, and a bypass 59 leads from the manifold 51 back to the delivery line 58 through a check valve 60 which permits flow only in the return direction indicated by the arrow in Fig. 1. From another outlet of the valve 54, a delivery line 61 leads to the manifold 49, and a bypass 62 leads from the manifold 50 back to the delivery line 61 through a check valve 63 adapted to pass fluid only in the return direction as indicated by the arrow. In one of the flow positions, the valve 54 will direct pressure fluid from the pressure line 56 to the delivery line 58 and thence into the lower chamber 13 to move the piston 9 upwardly while return fluid from the chamber 48 passes from the manifold 49 through the delivery line 61 and the valve 54 to the return line 57. When the upper limit of piston movement has been reached, pressure fluid in the chamber 13 will be bypassed through the bypass 62 and check valve 63 to the delivery line 61 thus preventing further piston movement. In the other flow position of the valve 54, pressure fluid from pressure line 56 will be directed upwardly through delivery line 61 and manifold 49 into chamber 48 to move the piston downwardly, while fluid from chamber 13 is exhausted through connection outlet 52 and delivery line 58 back to the valve 54. When the downward limit of piston movement has been reached, the pressure in the chamber 48 will be relieved through manifold 51, bypass 59 and check valve 60 to delivery tube 58.

The easel 7 comprises a pair of base members 64 connected by cross members 65 each having secured thereto and projecting upwardly therefrom, a pair of upwardly converging legs 66. The upper ends of each pair of legs 66 are secured to a vertical sleeve 67 in which is telescoped a shaft 68. A coil spring 69, within each sleeve 67, is engaged between the lower end of the shaft 68 and the closed bottom of the sleeve 67. The springs 69 function to absorb shocks imposed upon the hydraulic unit by the impact of the lower end of a drill pipe with the bottom of the mandrel 29, and thus protect the apparatus against damage. The shafts 68 project from the open upper ends of the sleeves 67 and carry at their upper ends bearings 70 in which are journalled trunnions 71. The trunnions 71 are mounted in blocks 72 that are secured to the manifolds 49 and 50. Secured to each bearing 70 and projecting upwardly therefrom is a socket 73 which may be utilized as a support for a mandrel 29 when the latter is detached from the stem 23 (the reduced lower end of the cone may be inserted into a socket 73).

The pivotal mounting of the hydraulic units in the bearings 70 provides for tilting of the entire hydraulic unit to assume the angle of a drill pipe inserted into the mandrel 29. Once this angle has been established, it may be fixed by means of anchor links each including a short length of chain 74 attached to the manifold 51 and having at its outer end a threaded rod 75 that is adapted to be passed through an apertured ear 76 secured to a leg 66 and to be threaded into a thumbnut 77 which, when screwed against the ear 76 will function to draw the adjacent side of the hydraulic unit toward that side of the easel. There is one of these tie links at each side of the easel and thus it is possible to tie the hydraulic unit to the easel so as to fix the position of the hydraulic unit.

In the practice of the method of the invention, the apparatus is transported to the site of operation and is lifted by means of the derrick winch up onto the derrick floor 78 (Fig. 7) alongside the rotary table 79, where it is arranged with the base members 64 straddling a radius of the rotary table and parallel thereto, so that the axis of the bearings 70 will be disposed transversely to such radius. The hydraulic unit is then adjusted to an angle of inclination corresponding to the angle that will be assumed by a drill pipe lowered into the mandrel 29. The mandrel 29 is detached from the stem 23 and a protector collar 33 is slipped over the upper end of the stem and rested upon the upper end of the follower sleeve 32. The mandrel 29 is then reattached to the upper end of the stem 23. Hydraulic pressure is then directed into the chamber 13 to move the piston 9 upwardly, causing the sleeve 16 to transmit pressure through the flange 19 to the guard sleeve and thence to the abutment 21, raising the latter and the sleeve 32 and collar 33 supported thereby, pushing the collar 33 upwardly over the cone 26 and expanding the collar 33 onto the mandrel 29. This movement is allowed to continue until the collar 33 has reached the position indicated at 33'. The latch bolts 43 are then relieved by pulling them upwardly and the abutment members 40 are spread apart while pressure fluid is introduced into the chamber 48 to move the piston downwardly, permitting the guard sleeve 20 to sink downwardly until the abutment members 40 are beneath the level of the collar 33'. The mandrel 29 is then detached from the stem 23 and a fresh collar is slipped over the upper end of the stem 23, and the mandrel is then reattached to the stem. The drill pipe 30 is then lowered into the mandrel. The abutment members 40 are then moved inwardly to the positions shown in Fig. 6, beneath the collar 33' and are latched in closed positions. Pressure fluid is again applied in the chamber 13 and a second cycle of operation is initiated, the second collar 33 being pushed upwardly and expanded over the cone 26 onto the mandrel 29 while the first collar 33' is pushed off of the end of the mandrel onto the drill pipe. As the upper end of the collar 33' grips the drill pipe, the drill pipe will be lifted in unison with the further upward movement of the collar so as to permit the collar to slide freely off the end of the mandrel 29 without resistance from the drill pipe.

The mandrel is then again detached from the stem, a third collar is inserted over the upper end of the stem, and the second cycle of operation is repeated. It will now be apparent that in each cycle of operation, one collar is expanded onto the mandrel while another collar is being pushed off the mandrel onto a drill pipe. After each cycle of operation, a drill pipe with a collar thereon may be withdrawn from the mandrel and attached to a section of pipe supported in the rotary table, and a new section of drill pipe may then be attached to the derrick winch and inserted into the mandrel. The operation of applying a protector collar can be executed in a short time, not over one or two minutes, as contrasted to an average of about ten minutes required for applying protector collars with existing apparatus. The necessity for carrying a mandrel with a collar applied thereto from the drill pipe rack to the derrick floor is completely eliminated.

Figure 8:
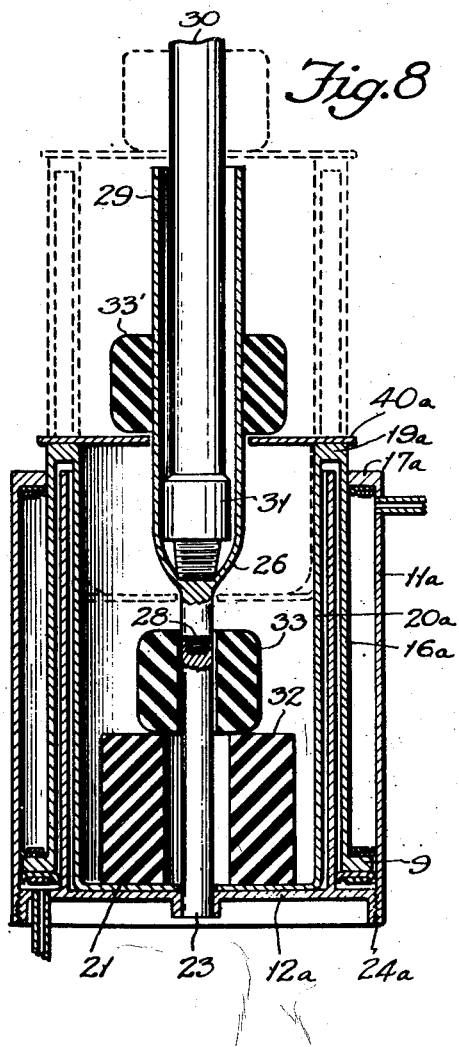
Fig. 8 is an axial sectional view of a modified form of apparatus also usable in the practice of the invention.
Figure 7:
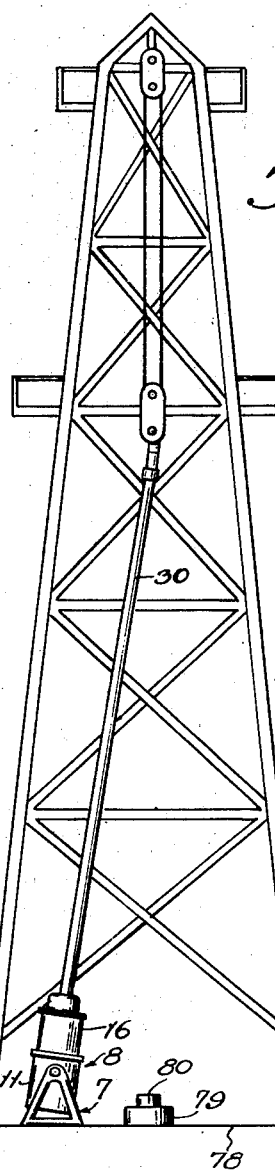
Fig. 7 is a schematic view showing the operation of the apparatus in an oil well derrick.

Fig. 8 illustrates a modified form of apparatus in which the guard sleeve 20a is integrally attached to the piston sleeve 16a by a bridging flange 19a, and in which the cap flange 17a is integrally attached to the outer cylinder 11a, the latter being detachably attached to the base 12a as by means of a threaded connection 24a. Other parts are the same as in Figs. 1-6, and are designated by the same reference numerals.

Figure 9:
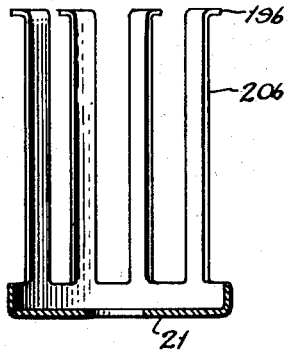
Fig. 9 is a detail sectional view of another apparatus capable of being satisfactorily used in the practice of the invention.

Fig. 9 illustrates how a guard cage comprising a plurality of circumferentially spaced arms 20b having at their upper ends outwardly projecting fingers 19b to engage the upper end of the sleeve 16, may be substituted for the sleeve 20 of Figs. 1-6.

For lifting the apparatus onto and off of the derrick floor I provide a pair of hooks 82 to which grapple chains on the derrick winch can be attached.

I claim:

1. Steps in the method of applying, at an oil well derrick, resilient annular protector collars to drill pipe sections each having a tool joint at one end, comprising: suspending a pipe section in the derrick with said tool joint at the lower end thereof; resting upon the floor of the derrick a press having an expanding cone detachably connected at its small end to a fixed part of the press and having, projecting from the large end of said cone, a mandrel in which the said tool joint may be completely and loosely received; inserting said tool joint completely within the mandrel; expanding onto the mandrel one of the protector collars; detaching the mandrel from the press and inserting another collar between the cone and the press; and simultaneously expanding a second collar onto the mandrel while pushing the first collar off the end of the mandrel directly onto the drill pipe above the tool joint, by pressure applied to said first collar through means independent of said second collar but operating in unison with the movement thereof; and lifting the drill pipe to facilitate simultaneous upward movement of said first collar and the drill pipe, with no relative movement between them, beginning approximately at a point where said first collar grips the drill pipe in being pushed off the mandrel.

2. Steps in the method of applying, at an oil well derrick, resilient protector collars to drill pipe sections each having a tool joint at an end thereof, comprising: suspending a pipe section in the derrick with said tool joint at the lower end thereof; inserting said tool joint completely and loosely within a tubular mandrel having at its lower end a downwardly pointing expander cone anchored in a fixed position; applying upward pressure to the collar to move and expand it upwardly over the cone onto the mandrel, arresting such upward movement, subsequently applying directly to the collar, positive upward pressure to move it over the upper end of the mandrel into gripping engagement with the drill pipe above the tool joint, continuing the application of pressure sufficiently to assure continued movement of the collar to a point where it will slide freely off the end of the mandrel, and lifting the drill pipe in unison with such continued movement so as to permit the collar to slide freely off the mandrel without resistance from the drill pipe.

LESTER W. BALLARD.

REFERENCES CITED

The following references are of record in the file of this patent:

UNITED STATES PATENTS

| Number | Name | Date |
|---|---|---|
| 1,520,842 | Newman | Dec. 30, 1924 |
| 1,792,612 | Staley | Feb. 17, 1931 |
| 1,904,931 | Rosenberg | Apr. 18, 1933 |
| 1,965,876 | Bettis | July 10, 1934 |
| 2,031,797 | Tarbox | Feb. 25, 1936 |
| 2,112,466 | Maloon | Mar. 29, 1938 |
| 2,143,546 | Day | Jan. 10, 1939 |
| 2,252,692 | Barnes | Aug. 19, 1941 |
| 2,324,747 | Weissert | July 20, 1943 |
| 2,372,544 | Borman et al. | Mar. 27, 1945 |
| 2,437,466 | Hail | Mar. 9, 1948 |